(12) United States Patent
Reid

(10) Patent No.: US 6,529,987 B1
(45) Date of Patent: Mar. 4, 2003

(54) HOT PLUGGINS IN A PCI BUS SYSTEM

(75) Inventor: Eddie M. Reid, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/392,348

(22) Filed: Sep. 8, 1999

(51) Int. Cl.[7] .............................................. G06F 13/00
(52) U.S. Cl. ...................................... 710/302; 710/313
(58) Field of Search ................................ 710/300, 301, 710/302, 119, 313, 305, 306, 311, 312, 314; 714/5; 709/200, 253

(56) References Cited

U.S. PATENT DOCUMENTS

| | | | | |
|---|---|---|---|---|
| 5,784,576 A | * | 7/1998 | Guthrie et al. | 710/302 |
| 5,872,998 A | * | 2/1999 | Chee | 710/56 |
| 5,875,308 A | * | 2/1999 | Egan et al. | 710/302 |
| 6,158,000 A | * | 12/2000 | Collins | 712/21 |
| 6,247,079 B1 | * | 6/2001 | Papa et al. | 710/302 |
| 6,330,656 B1 | * | 12/2001 | Bealkowski et al. | 709/226 |

OTHER PUBLICATIONS

PCI Local Bus, "PCI Hot–Plug Specification", Revision 1.0, Oct. 6, 1997, pp. 1–38

* cited by examiner

Primary Examiner—Xuan Thai
(74) Attorney, Agent, or Firm—Fish & Richardson P.C.

(57) ABSTRACT

A hot-plug capable PCI bus system has only one slot coupled to each PCI bus. A bridge controller monitors and de-activates a particular PCI bus connected to the selected hot-plug slot being serviced for hot-plug operation.

26 Claims, 5 Drawing Sheets

HOT PLUGGINS IN A PCI BUS SYSTEM

BACKGROUND

The invention relates to hot plugging in a Peripheral Component Interconnect (PCI) bus system.

In computer systems operating with PCI hot-plug capable buses, the system can be powered and running while PCI adapter cards are plugged into or removed from PCI hot-plug slots. The PCI hot-plug capability, defined in *PCI Hot-Plug Specification*, Revision 1.0, Oct. 6, 1997, PCI Special Interest Group, Portland, Oregon, is especially desirable in network computer systems. The hot-plug capability allows maintenance to be performed on a server in a network computer system without having to power down the server.

The PCI hot-plug model include multiple adapter card slots simultaneously tied to the PCI bus and often requires controllers to monitor and control power, bus and clock signals. The system also requires power and bus isolation devices for isolating the PCI hot-plug slots during hot-plug operation.

SUMMARY

In one aspect, the present specification involves a hot-plug capable PCI bus system with only one device, such as a slot, coupled to each PCI bus. The PCI bus system is configured to interface with external devices, and includes hot-plug slots, PCI buses, and a bridge controller. The need for isolating the hot-plug slot from a PCI bus is reduced by having only one device attached to the bus. Therefore, the PCI bus can be turned off during the hot-plug operation.

The PCI cards that are plugged into the hot-plug slots are configured to interface.with the external devices by formatting and sending data to and from the external devices and the PCI bus system. The PCI buses channel data to and from the hot-plug slots. Each PCI bus connects to only one hot-plug slot.

The bridge controller is,capable of monitoring and de-activating a particular PCI bus connected to the selected hot-plug slot being serviced for hot-plug operation. During hot-plug operation, the selected hot-plug slot can be serviced while the other PCI buses are operating.

Another aspect involves a method for removing an adapter card from a selected hot-plug slot during hot-plug operation of a PCI bus. The method involves electrically disconnecting the adapter card from power supply and the PCI bus, quiescing adapter card activities, and de-activating PCI bus interface pins. An attention indicator for the selected hot-plug slot is driven to indicate that the hot-plug slot is off and the adapter card can be removed.

In a further aspect, a method for inserting an adapter card to a selected hot-plug slot during hot-plug operation of a PCI bus is disclosed. The method involves inserting the adapter card into the hot-plug slot, electrically connecting power to the adapter card, and re-activating PCI bus interface pins. A power indicator for the selected hot-plug slot can be driven to indicate that the hot-plug slot is on.

Other features and advantages will become apparent from the following description and drawings, and from the claims.

DETAILED DESCRIPTION

Figure 1:
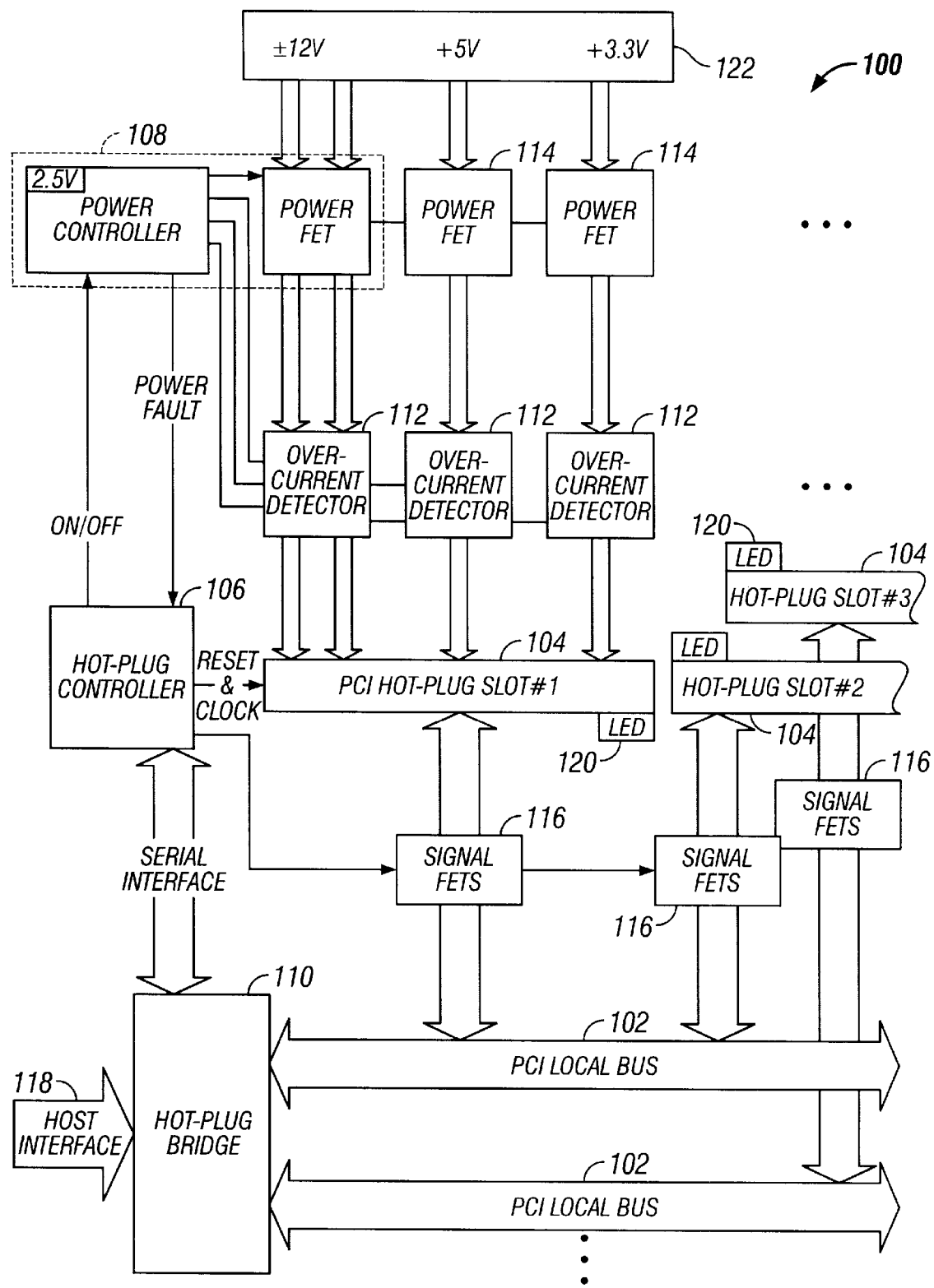
FIG. 1 is a block diagram of a PCI hot-plug system.

A conventional PCI hot-plug system 100 (FIG. 1) includes PCI local buses 102, hot-plug slots 104, a hot-plug controller 106, a power controller 108, a hot-plug bridge 110, a power supply 122, and various isolation devices 114, 116. The PCI hot-plug system 100 may include over-current detectors 112 for detecting when a slot draws excessive current or voltage goes out of regulation limits and for informing the power controller 108 of any over-current fault. An attention indicator, such as light-emitting diode (LED) 120, associated with each hot-plug slot calls the operator's attention to a particular hot-plug slot when that slot is being serviced.

The hot-plug bridge 110 connects host interface bus 118 of a host system to the PCI local buses 102. Each PCI local bus may have multiple hot-plug slots 104 attached to it through bus signal isolation devices, such as field-effect transistor (FET) switches 116.

Each PCI hot-plug slot 104 must also connect to the system power supply 122 through slot-specific power FET switches 114. The power FET switches 114 are controlled by the slot-specific power controller 108. PCI adapter cards (not shown), which plug into the hot-plug slots 104, are limited to a maximum load and decoupling capacitance on each supply voltage.

The hot-plug controller 106 commands the power controller 108 to turn the power FET switches 114 on or off. The power controller 108 ensures that the supply voltages rise at a rate between a specified minimum and maximum slew rate of the PCI Hot-Plug Specification by controlling the turn on of the FET switches.

Figure 2:
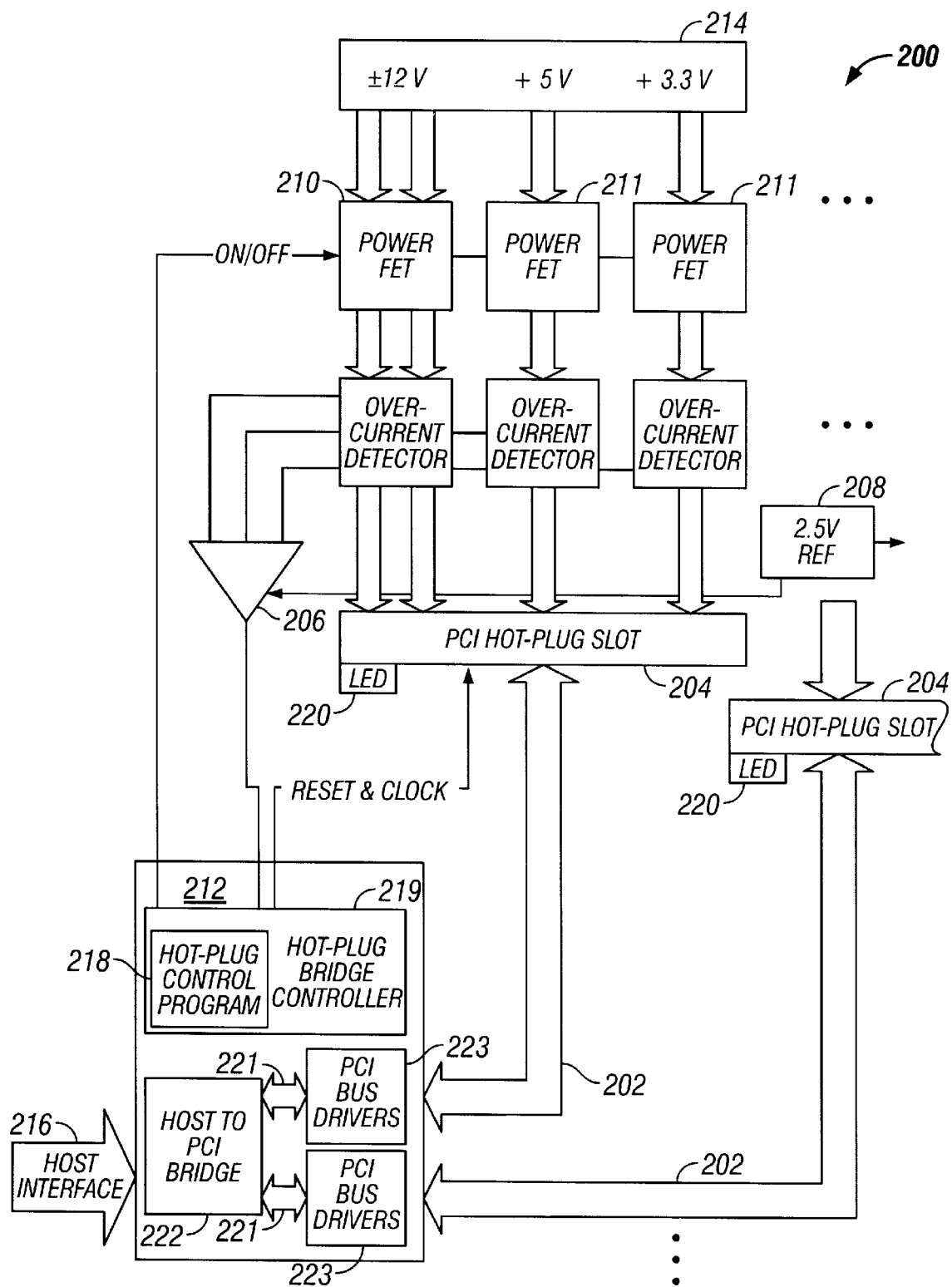
FIG. 2 is a block diagram of an enhanced PCI hot-plug system.

In FIG. 2, an enhanced PCI hot-plug system 200 has only one adapter card slot 204 attached to each PCI local bus 202, eliminating the bus signal FET switches 116, the slot-specific power controller 108, and the hot-plug controller 106 from the conventional system 100 (shaded boxes in FIG. 1). The enhanced system 200 also has over-current and voltage range detection op-amps 206, a replacement power FET switch 210, and a 2.5 volt reference chip 208 (shaded boxes in FIG. 2). One reference chip 208 can be used to provide a 2.5 volt reference voltage to all PCI hot-plug slots 204.

The functions of the power controller 108 and the hot-plug controller 106 are moved into the hot-plug bridge controller 219. The functions can be implemented in the hot-plug bridge controller 219 residing within a PCI/host interface module 212 and executed by a hot-plug control program 218.

The over-current and voltage range detection op-amps 206 perform over-current, as well as under and over-voltage, detection logic to prevent the hot-plug slot 204 from drawing excessive current. The hot-plug bridge controller 219 is configured to adjust the slew rate of the power supply 214 slowly to prevent excessive current draw. This prevents dips in the voltage of the nearby cards.

There are several steps involved in turning on or off a PCI hot-plug slot. Some of these steps have the potential of interfering with the PCI host bridge controller. Therefore, it is desirable to electrically disconnect the hot-plug slot 204 entirely from its host PCI bridge controller 222. In the enhanced PCI hot-plug system, PCI bus drivers 223 are controlled by the hot-plug control program during the hot-plug operation to isolate the slot 204 from the host PCI bridge controller 222.

Figure 3:
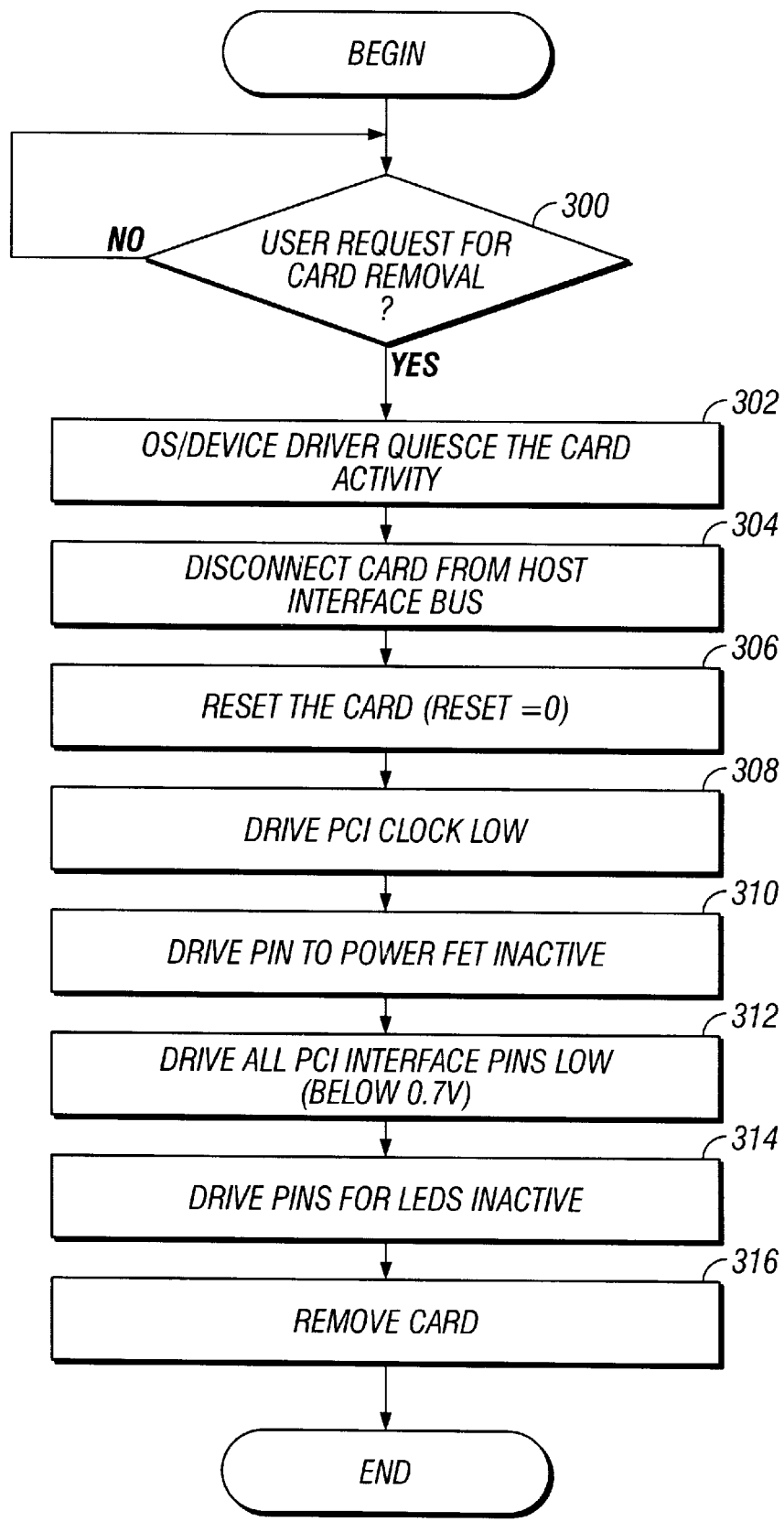
FIG. 3 is a flowchart of an interface card removal process for the enhanced PCI hot-plug system.

In FIG. 3, the process of removing an adapter card from the enhanced PCI hot-plug system 200 begins with the operator determining that an adapter card should be removed or replaced, and notifying the hot-plug user interface control program, at step 300. This is often done through a graphical user interface (GUI).

Once the hot-plug user interface control program is notified of the operator's decision, the program directs the operating system (OS) or in some cases the card device driver of the computer to quiesce the appropriate adapter card activity, at step 302. The control program 218 then disconnects the adapter card from the host PCI bridge controller 222, at step 304, by turning off the signal drivers 223 to the PCI slot 204 and setting the internal PCI local bus 221 inactive. In an alternative embodiment, the operator manually disconnects the adapter card from the host bus 216 by activating a switch assigned to the card.

Once the adapter card is disconnected, the hot-plug control program 218 resets the adapter card by driving $\overline{RESET}$ signal active, at step 306. At this point, the adapter card will not initiate any bus activity, and the operating system cannot access the card until the operator notifies the hot-plug control program 218 to resume use of the card.

The hot-plug control program 218 then disables the clock signal to the appropriate hot-plug slot 204, at step 308, and removes power from the slot 204, at step 310, by driving the power FET switches 210, 211 inactive. Subsequently, at step 312, the control program 218 drives all PCI interface pins low by forcing the pins to ground level voltage (GND). Finally, the control program 218 can drive the attention LED 220 for the appropriate hot-plug slot 204, at step 314, to indicate that the hot-plug slot 204 is turned off. The operator may now remove the adapter card from the slot 204, at step 316.

Figure 4:
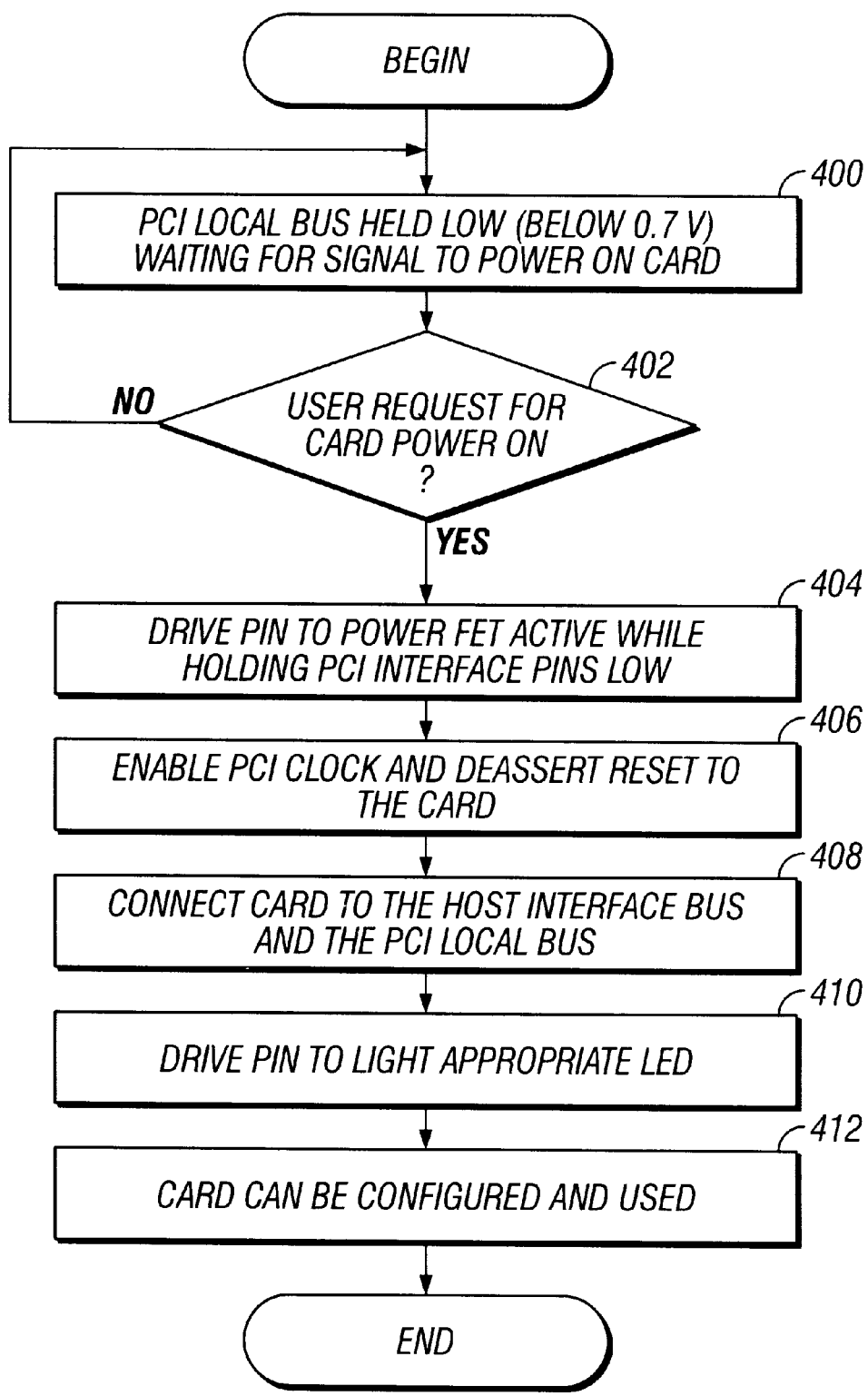
FIG. 4 is a flowchart of an interface card insertion process for the enhanced PCI hot-plug system.

As seen in FIG. 4, the process of inserting an adapter card into enhanced PCI hot-plug system 200 begins with a PCI local bus 202 held in an inactive state. The hot-plug control program 218 holds the PCI bus 202 at a GND state, at step 400, until the operator finishes inserting the adapter card and requests the power to the adapter card be turned on, at step 402. This can be done through a GUI or by configuring the control program 218 to monitor the switch that indicates the card is locked securely in place.

When insertion process starts, the hot-plug control program 218 drives the power FET switches 210, 211 active while holding the PCI interface pins at GND, at step 404. Therefore, the power pins must be activated first, before the PCI interface pins are turned on, to prevent damage to the adapter card. The hot-plug control program 218 then stops driving the PCI interface pins to GND, asserts reset and starts the PCI clock at step 406. After a short time, the reset signal is de-asserted to the adapter card, at step 408.

After the power and clock signals are activated, the adapter card is connected to the host PCI bridge internal bus 221 and the host PCI bridge controller 222, at step 410. The adapter may now be configured and used, at step 414.

Figure 5:
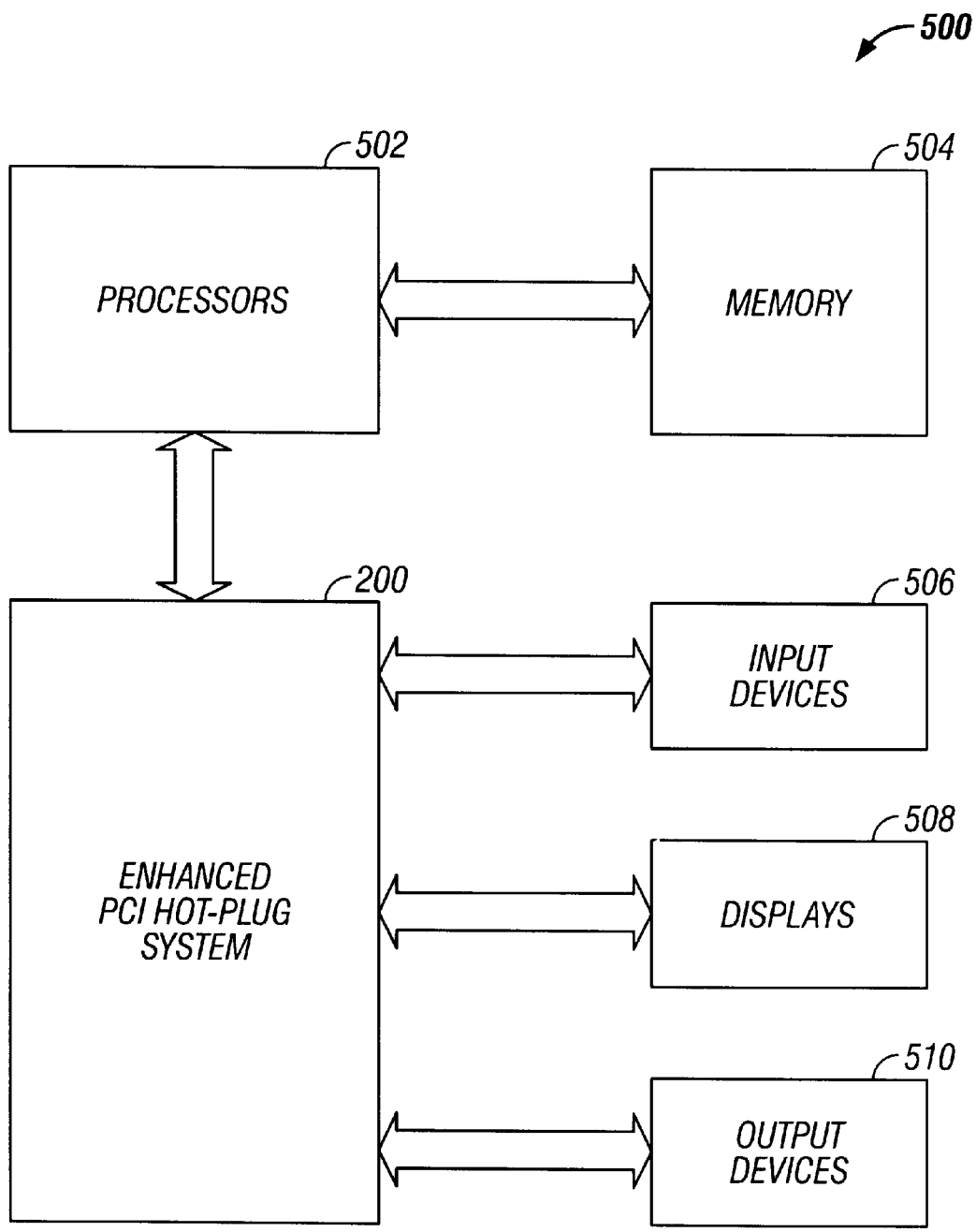
FIG. 5 is a block diagram of a multiprocessor system.

Referring to FIG. 5, a multiprocessor system 500 including the enhanced PCI hot-plug system 200 can be configured as any system requiring hot-plug capability, such as a network server system or a hyperlink network controller.

The multiprocessor system 500 includes processors 502, a memory 504, input/output (I/O) devices 506, 508, 510, and the enhanced PCI hot-plug system 200. The PCI hot-plug system 200 carries data to and from the processors 502 and the I/O devices, such as input devices 506, displays 508, or output devices 510. The PCI hot-plug system 200 also allows adapter cards for the I/O devices 506, 508, 510 to be removed or inserted while the multiprocessor system 500 is continuing to operate. Thus, the enhanced PCI hot-plug system 200 allows hot-plug operations to occur at lower cost and higher bandwidth.

One of the advantages of the enhanced PCI hot-plug system 200 is fewer parts and potentially lower cost implementation per slot.

Other advantages of the enhanced PCI hot-plug system 200 include lower complexity of the circuitry and higher bandwidth. For example, a single slot enhanced PCI bus can run up to 133 MHz at 1 GByte/sec bandwidth compared to a conventional four-slot PCI bus system that runs at 33 MHz at one-fourth the bandwidth of the single-slot system. Therefore, one slot per bus design offers significant improvement in bandwidth over the multiple slot per bus design.

Although only a few embodiments have been described in detail above, those of ordinary skill in the art certainly understand that modifications are possible. For example, a hot-plug control program can be implemented in digital discrete components, in application specific integrated circuits (ASICs), in computer programs executed by programmable processors, or in some combination of these technologies. Furthermore, the hot-plug slot design can be modified to connect directly to the I/O devices without interfacing with adapter cards. All such modifications are intended to be encompassed within the following claims, in which:

What is claimed is:

1. A hot-plug capable PCI bus system, comprising:
   hot-plug slots operating to interface the PCI bus system with external devices, each hot-plug slot including interface pins;
   PCI buses;
   sets of drivers corresponding to each of the PCI buses, each set of drivers to connect one PCI bus to one hot-plug slot; and
   a controller coupled to said PCI buses and configured to deactivate a selected PCI bus connected to a slot engaged in a hot-plug operation, said controller operating to cause the drivers to drive the interface pins of the slot to a ground state and interrupt power to the slot during the hot-plug operation.

2. The system of claim 1, further comprising:
   an under-voltage and an over-voltage detection circuit to generate corresponding under and over-voltage signals; and
   an over-current detection circuit coupled to said hot-plug slots, said detection circuit configured to detect an amount of current flowing into each of the hot-plug slots.

3. The system of claim 2, further comprising:
   a reference voltage used by said over-current detection circuit to generate an over-current signal.

4. The system of claim 2, further comprising:
   reference voltages used by said under and over-voltage detection circuit; and
   a comparator operating to compare said reference voltages with said under and over-voltage signals generated by said detection circuit.

5. The system of claim 1, further comprising:

a power supply having supply voltages, said power supply configured to supply power to the hot-plug slots; and power switches for connecting said supply voltages to the hot-plug slots.

6. The system of claim 5, wherein the controller controls a slew rate of the power supply by regulating switching durations of the power switches.

7. The system of claim 5, wherein the controller controls a slew rate of the power supply by slowly adjusting the slew rate to prevent excessive current draw.

8. The system of claim 1, wherein said PCI buses include enhancements made to the buses.

9. A hot-plug PCI bus system, comprising:

PCI local buses;

sets of drivers corresponding to each of the PCI local buses;

adapter card slots, each PCI local bus connected to only one slot through a corresponding set of drivers, said slots capable of receiving an adapter card, of said adapter card slot including interface pins; and a hot-plug bridge controller configured to control data being channeled through said PCI local buses, the controller operating to cause the drivers to control the interface pins of the slots between an energized state and a ground state and to control power to each of the slots.

10. The system of claim 9, wherein said PCI local buses send and receive data between a host interface bus and the adapter card.

11. The system of claim 9, wherein said hot-plug bridge controller is configured to selectively disconnect data channeling between a host interface bus and a selected adapter card slot.

12. The system of claim 9, wherein said hot-plug bridge controller enables hot-plug removal and insertion of the adapter card to and from the selected adapter card slot.

13. The system of claim 9, further comprising:

attention indicators associated with respective adapter card slots to indicate the states of hot-plug operation of the slots.

14. The system of claim 9, further comprising:

supply voltages powering each of said adapter card slots.

15. The system of claim 14, further comprising:

power isolation devices operating to connect said supply voltages to each slot of said adapter card slots.

16. A method for removing an adapter card from a selected hot-plug slot during hot-plug operation of a PCI bus, the method comprising:

receiving a request for removal of the adapter card;

in response to the request, quieting activity to the adapter card;

resetting the adapter card;

electrically disconnecting said adapter card from a power supply and the PCI bus;

forcing PCI bus interface pins to a ground state; and after said forcing, removing the adapter card from the selected hot-plug slot.

17. The method of claim 16, wherein electrically disconnecting said adapter card includes de-activating pins to power switches.

18. The method of claim 16, wherein said de-activating PCI bus interface pins includes driving all PCI interface pins to ground level voltages.

19. The method of claim 16, further comprising:

driving an attention indicator for the selected hot-plug slot to indicate that the hot-plug slot is off.

20. A method for inserting an adapter card to a selected hot-plug slot during hot-plug operation of a PCI bus, the method comprising:

holding PCI interface pins at a ground state;

inserting the adapter card to the selected hot-plug slot while holding the PCI interface pins at the ground state;

receiving a power on request;

in response to the power on request, electrically connecting power to the adapter card;

pulsing a reset signal corresponding to the selected hot-plug slot; and re-activating the PCI bus interface pins.

21. The method of claim 20, further comprising:

holding PCI interface pins below 0.7 volts before electrically connecting power to the adapter card.

22. The method of claim 20, further comprising:

driving attention indicator for the selected hot-plug slot to indicate that the hot-plug slot is on; and configuring the adapter card for normal operation when the attention indicator indicates that the hot-plug slot is on.

23. A computer program, residing on a computer readable medium, for hot-plug removal of an adapter card from a selected hot-plug slot during hot-plug operation of a PCI bus, the program comprising executable instructions that enable the computer to:

receive a request for removal of the adapter card;

in response to the request, quiet activity to the adapter card;

reset the adapter card;

electrically disconnect said adapter card from a power supply and the PCI bus; and force PCI bus interface pins to a ground state during removal of the adapter card.

24. A computer program, residing on a computer readable medium, for hot-plug insertion of an adapter card to a selected hot-plug slot, the program comprising executable instructions that enable the computer to:

hold PCI bus interface pins at a ground state;

receive a power on request;

in response to the power on request, electrically connect power to the adapter card;

pulse a reset signal corresponding to the selected hot-plug slot; and re-activate the PCI bus interface pins.

25. A multiprocessor system comprising:

a memory device configured to store data;

processors coupled to the memory device and operating to process the data; and a hot-plug bus system coupled to said processors, said bus system including:

local buses and hot-plug slots, each hot-plug slot including interface pins and capable of receiving an adapter card and enabling hot-plug operation, said hot-plug slot connecting to only one local bus;

sets of drivers corresponding to each of the local buses, each set of drivers to connect one local bus to one hot-plug slot;

a host bus configured to channel data between the processors and the hot-plug bus system;

a controller coupled to said host bus and said local buses, said controller configured to deactivate a selected local bus connected to a hot-plug slot engaged in a hot-plug operation, said controller operating to cause the drivers to drive the interface pins of the slot to a ground state interrupt power to the slot; and external devices configured to send and receive data through the hot-plug bus system.

26. The system of claim 25, wherein the multiprocessor system is a network server system.

* * * * *